United States Patent [19]

Klüting et al.

[11] Patent Number: 4,564,236

[45] Date of Patent: Jan. 14, 1986

[54] SEAT, PARTICULARLY A POWER VEHICLE SEAT

[75] Inventors: Bernd Klüting, Radevormwald; Klaus D. Bertram, Remscheid, both of Fed. Rep. of Germany

[73] Assignee: Keiper Recaro GmbH & Co., Remschied, Fed. Rep. of Germany

[21] Appl. No.: 562,402

[22] Filed: Dec. 16, 1983

[30] Foreign Application Priority Data

Dec. 16, 1982 [DE] Fed. Rep. of Germany ....... 3246564

[51] Int. Cl.⁴ .................................................. A47C 1/02
[52] U.S. Cl. ..................................... 297/344; 297/362; 297/369
[58] Field of Search .............. 297/344, 346, 362, 354, 297/355, 363, 364, 365, 366, 367, 368; 248/429, 430

[56] References Cited

U.S. PATENT DOCUMENTS

| | | | |
|---|---|---|---|
| 3,673,891 | 7/1972 | Pickles | 297/362 X |
| 3,719,387 | 3/1973 | Boschen et al. | 297/355 |
| 4,020,717 | 5/1977 | Johnson | 297/362 X |
| 4,195,884 | 4/1980 | Muhr et al. | 297/362 |
| 4,227,741 | 10/1980 | Gross et al. | 297/362 |

FOREIGN PATENT DOCUMENTS

| | | | |
|---|---|---|---|
| 2041302 | 2/1972 | Fed. Rep. of Germany | 297/362 |
| 1042181 | 9/1966 | United Kingdom | 297/369 |
| 1170708 | 11/1969 | United Kingdom | 297/362 |
| 2107575 | 5/1983 | United Kingdom | 297/344 |

Primary Examiner—William E. Lyddane
Assistant Examiner—José V. Chen
Attorney, Agent, or Firm—Michael J. Striker

[57] ABSTRACT

A seat, particularly a power vehicle seat, has seat rail elements arranged at both longitudinal sides and forming a connection between a vehicle body and the seat part, each of the seat rail elements has a guide rail and a movable rail displaceably longitudinally relative to the guide rail, each of the movable rails includes a carrying member and a holding member together forming a T-shaped movable rail, a hinge connected with the seat part and connecting the movable rail with the back part, the hinge includes two hinge parts formed as a position adjusting and fixing transmission, wherein one of the hinge parts is fixedly connected with the carrying member of the T-shaped movable rail, whereas the other hinge part is connected with the back part and surrounded by the holding member of the T-shaped movable rail.

6 Claims, 7 Drawing Figures

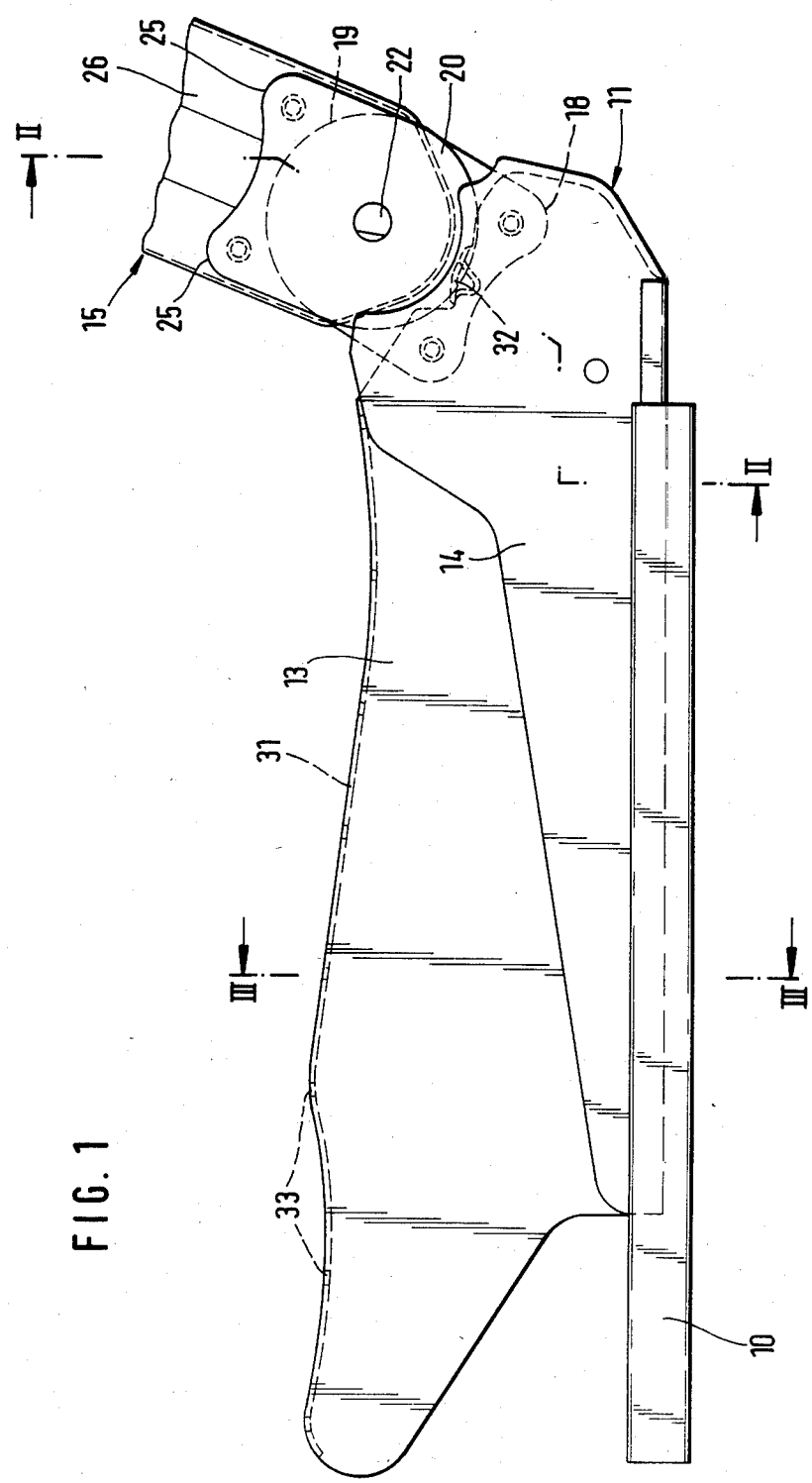

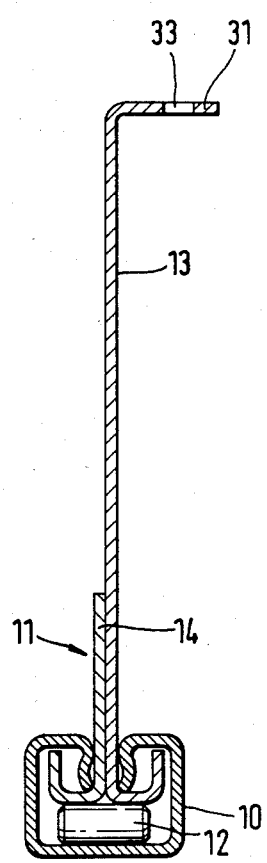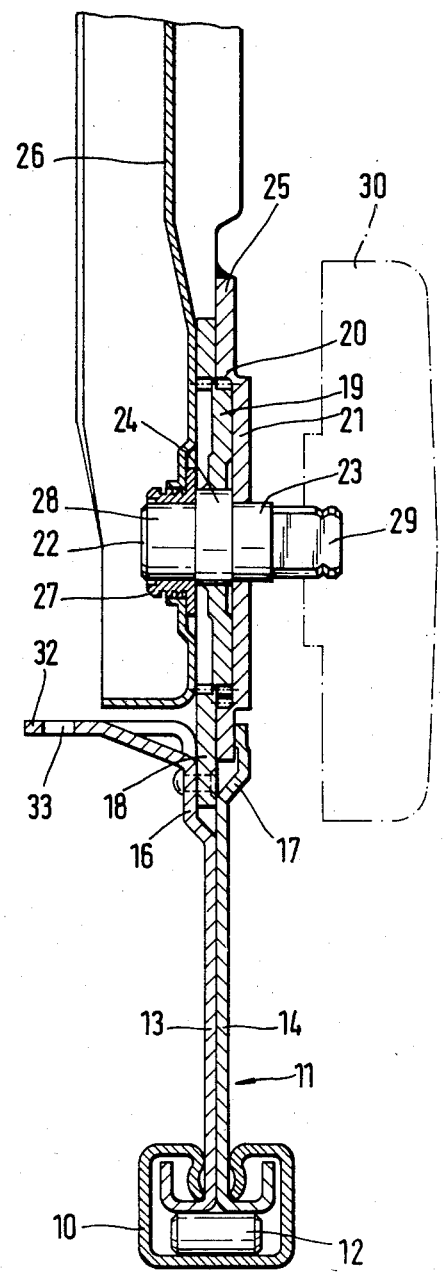

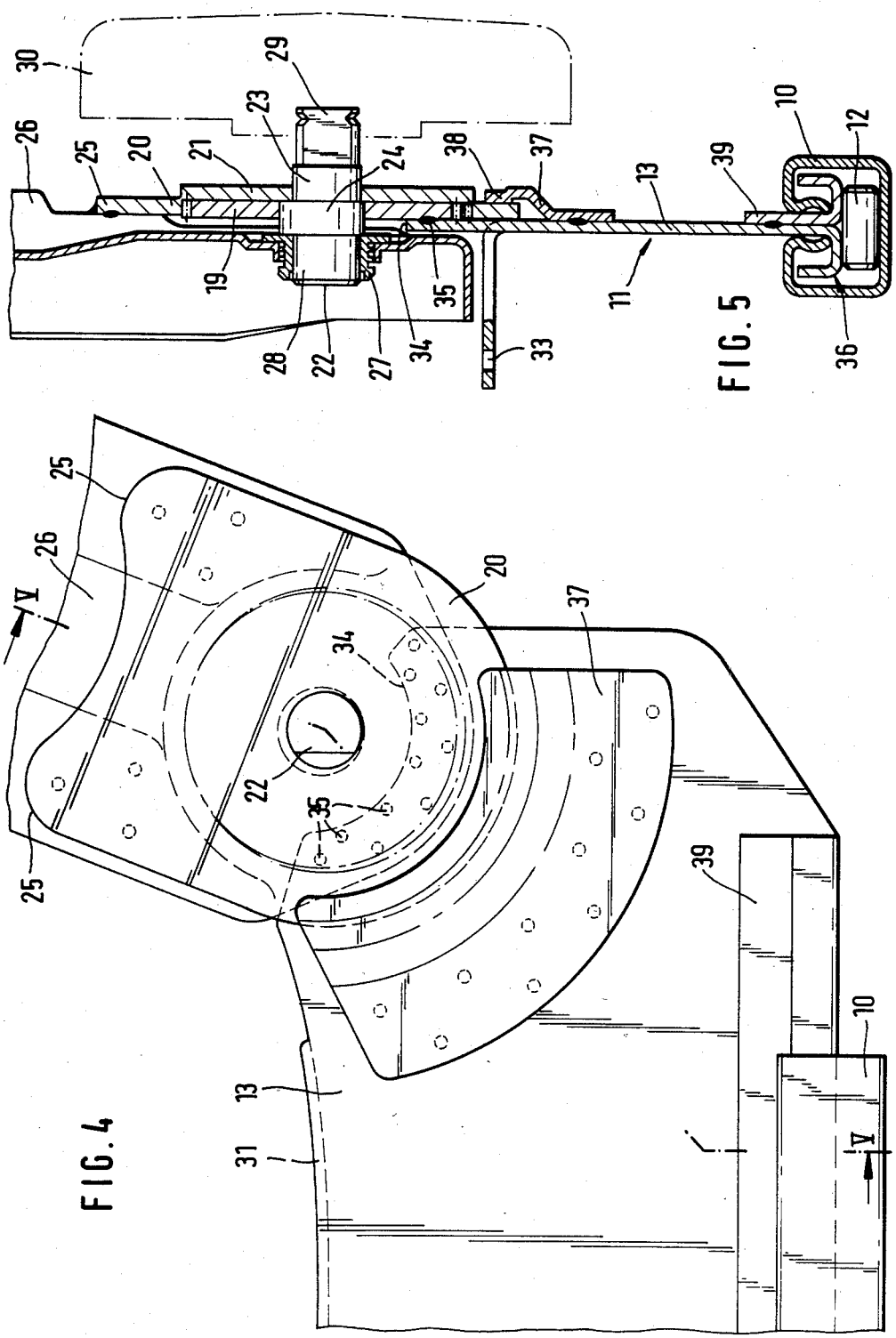

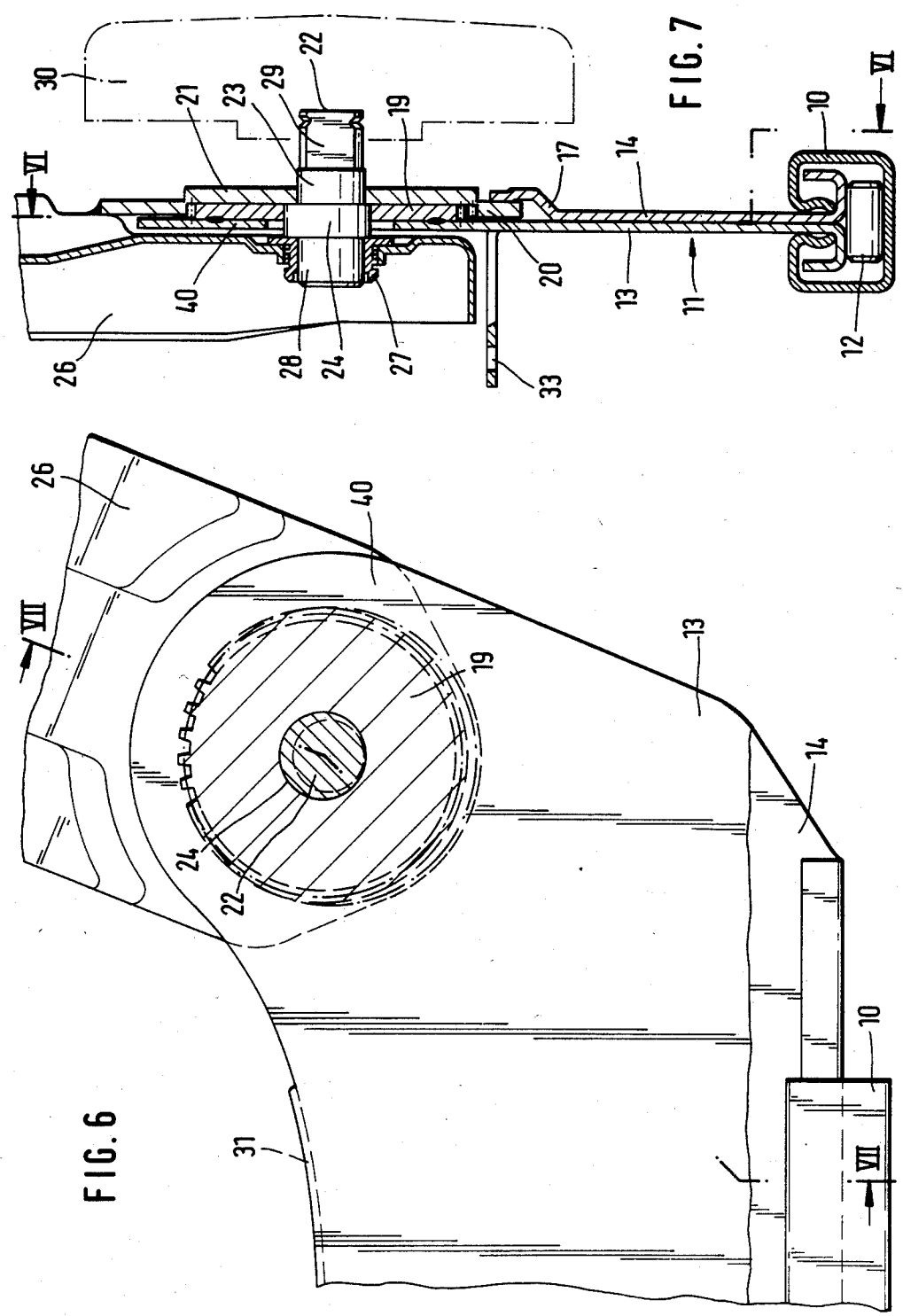

SEAT, PARTICULARLY A POWER VEHICLE SEAT

BACKGROUND OF THE INVENTION

The present invention relates to a seat, particularly a power vehicle seat.

A power vehicle seat is known, which has seat rail elements arranged at both longitudinal sides and forming a connecting member between a power vehicle body and the seat, each seat rail element has a guide rail and a longitudinally movable rail composed of a carrying member and a holding member together forming a T-shaped movable rail. The movable rail is connected in its rear region with a hinge which connects the back part with the seat part, the hinge has hinge parts which are pivotally connected with one another by a pivot axle and together define a position-adjusting and fixing device formed as a transmission. Such a seat is disclosed for example in the DE-OS No. 2,659,308. In the seat disclosed there, the hinge connecting the back part with the seat part is formed on the hinge part associated with the seat part as a seat carrier. The seat part is mounted on the seat carrier on the one hand and the seat carrier is supported on a guide rail via a pivotable support. Although the utilization of the lower hinge part as a seat support is advantageous, a complete integration of the seat part and the seat carrier is not obtained, since for forming the seat cushion a separate seat frame is required.

Further, a seat rail is known in which in addition to the guide rail, the movable rail is assembled from two shaped sheets and is connected with the seat part without interposition of special connecting parts. However, it is required to use between the seat part and the back part a hinge which, on the one hand, is formed as a separate structural element and, on the other hand, is provided on its hinge lever with connecting ears for connecting with the back part and with connecting ears for connecting with the seat part frame. An integration of the hinge with the movable rail is in this solution not possible.

SUMMARY OF THE INVENTION

Accordingly, it is an object of the present invention to provide a seat, particularly a power vehicle seat, which avoids the disadvantages of the prior art.

More particularly, it is an object of the present invention to provide a seat, particularly a power vehicle seat, in which its movable rail with maintaining the advantages of its function as a seat lateral frame integrates in it the hinge for connecting the seat part with the back part.

In keeping with these objects and with others which will become apparent hereinafter, one feature of the present invention resides, briefly stated, in a seat in which one hinge part is fixedly connected with a carrying member of the T-shaped movable rail, whereas the other hinge part connected with the back is at least partially surrounded by the holding member of the T-shaped movable rail.

Thereby the hinge is a component of the movable rail which together with the guide rail forms the seat rail element and forms together with the same a structural unit. Because of lower structural expenditures, this allows an economical manufacture and leads to reduction of space consumption.

For eliminating a seat part frame and for making possible formation of the seat part with integration of the movable rail, the carrying member of the T-shaped movable rail, in accordance with another feature of the present invention, is provided at its upper side with a bend which extends substantially in correspondence with the seat contour and is formed with receiving means for seat cushion.

In accordance with yet another feature of the present invention, for providing transmission forces of the hinge with a working line close to the supporting plane of the seat rail in order to eliminate bending moments, the carrying member is provided with a first bend extending toward the seat medium, and the holding region of the holding member is provided with a second bend extending outwardly.

Though there is a possibility to connect the annular gear of the hinge with the movable rail and to arrange the spur gear of the back part in the annular gear, it is advantageous to provide a reverse arrangement and allow the annular gear to "wobble" on the spur gear. It is thereby advantageous when the carrying member has a segment-like cut-out in its connecting region and is connected with the spur gear of the position adjusting and fixing device directly. In this case the annular gear engages the spur gear in a known manner and supports on a pivot axle whose eccentric portion is arranged in the spur gear. The back part frame is connected with the annular gear.

For making possible a stable connection of the spur gear with the carrying member of the T-shaped movable rail, an alternative embodiment of the present invention provides for the carrying member which in its connecting region has a connecting ear completely surrounding the spur gear and fixedly connected with the latter. The connection can be carried out by pins, screws, rivets, etc. Alternatively, the structural elements can be welded with one another.

Still a further feature of the present invention is that, for reducing the material consumption, the removable rail includes the above mentioned carrying member, whereas the holding member is formed of a finishing part which is connected in the foot region with the carrying member and engages the guide rail, and a holding segment which is arranged in the connection region for the hinge and axially supports the latter. Thus, the uninterrupted sheet plate extending from the foot region of the movable rail up to the connecting point of the hinge is dispensed with.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view of a seat rail element with a hinge of a seat in accordance with the present invention;

FIG. 2 is a view showing a vertical section of the seat rail element, taken along the line II—II in FIG. 1, on an enlarged scale;

FIG. 3 is a view showing a vertical section of the seat rail, taken along the line III—III in FIG. 1, on an enlarged scale;

FIG. 4 is a side view showing a hinge connecting region of a movable rail of a seat in accordance with another embodiment of the invention;

FIG. 5 is a view showing a vertical section of the connecting region of a movable rail, taken along the line V—V of FIG. 4;

FIG. 6 is a side view showing a movable rail with a hinge connecting region in section taken along the line VI—VI in FIG. 7 of a seat in accordance with a further embodiment of the present invention; and FIG. 7 is a view showing the hinge connecting region of the movable rail of FIG. 6, in a vertical section taken along the line VII—VII in FIG. 6.

DESCRIPTION OF THE PREFERRED EMBODIMENTS

A seat in accordance with the present invention has, as known in the art, a seat part which is not shown in the drawing and a back part 15 which is rotatably connected with the seat part. A seat rail is a component of the seat part as shown in the embodiment of FIGS. 1-3.

The seat rail has a guide rail 10 and a movable rail 11 displaceable from the former. The movable rail is supported on rolling bodies formed as rollers 12 in the guide rail 10 which has a substantially C-shaped cross section. The movable rail is assembled from two shaped sheets so as to form a rail of a substantially T-shaped cross section. One of the shaped sheets is a carrying member 13, whereas the other of the shaped sheets is a holding member 14.

The carrying member 13 and the holding member 14 can be connected with one another to form the T-shaped movable rail 11, for example by point welding. In the front region of the T-shaped movable rail, the carrying member 13 is higher relative to the holding member 14, whereas in the rear region of the T-shaped movable rail the carrying member 13 and the holding member 14 are of substantially the same height. In this rear region in the embodiment shown in FIGS. 1-3, both the upper edge region of the carrying member 13 and of the holding member 14 are provided with a bend 16 and 17, respectively. A punched connecting tongue of a spur gear 19 is connected with the bend 16 of the carrying member 13, for example by riveting, screwing, or welding.

The spur gear 19 engages with an annular gear 20 which surrounds the spur gear and is formed by punching of a supporting disk 21 which is supported on a pivot axle 22. The pivot axle 22 has a centric portion 23 and an eccentric portion 24 immediately adjacent to the first portion. The spur gear 19 is rotatably supported on the eccentric portion 24. The annular gear 20 has an upper region provided with a connecting ear 25 which are fixedly connected with a back frame 26. This can be done in conventional manner by riveting, screwing or welding. The back frame 26 is rotatably supported via a bearing bush connected therewith for joint rotation, on a bearing pin 28 associated with the centric portion 23 of the pivot axle 22. A driving pin 29 is connected with the centric portion 23 of the pivot axle 22 and serves for connecting a handle 30 shown in dash-dot lines.

The spur gear 19 has a number of teeth which differs from the number of teeth of the annular gear 20 by at least one tooth. The outer diameter of the spur gear 19 is at least by one tooth height smaller than the foot circle diameter of the annular gear 20. The eccentricity of the eccentric portion 24 relative to the centric portion 23 or the bearing pin 28 corresponds to the difference of the rolling circle radii of the spur gear 19 and the annular gear 20. The spur gear 19 and the annular gear 20 form together with the pivot axle 22a self-locking and steplessly adjustable hinge for connecting the back frame 26 with the T-shaped movable rail 11. The spur gear 19 and the annular gear 20 form the hinge parts of the hinge.

In the upper region of the hinge its axial assembly is carried out by the connection of the connecting gears 25 with the back frame 26, so that its supporting leg which receives the bearing bush 27 overlaps the edge region of the spur gear 19. In the lower region of the hinge, the axial assembly is carried out by the bend 17 of the holding member 14 which laterally overlaps the annular gear. The holding member serves for forming the T-shaped foot region of the T-shaped movable rail, reinforcing the rear connecting region of the hinge and its axial assembly. The carrying member 13 serves, in addition to forming the T-shaped foot region of the movable rail and the supporting as well as connecting the hinge, also for receiving the seat cushion. For this purpose the carrying member at its upper side is provided with an angle 31 formed in accordance with the seat contour. Also, in the region of the hinge an angle leg 32 is formed on the carrying member, and the angle 31 and the angular leg 32 are provided with receiving elements 33 for the seat cushion.

The seat in accordance with the embodiment shown in FIGS. 4 and 5 is in principle similar to the seat of the embodiment of FIGS. 1-3. It differs however from the former in the formation and connection of the hinge with the T-shaped movable rail 11 and the formation of the rail itself. The hinge shown in FIG. 5 has a disk formed as the spur gear 19, not provided with bend connecting tongue. Moreover, the carrying member 13 of the T-shaped movable rail 11 is extended in a radial direction over the head circle of the teeth of the spur gear 19 toward the pivot axle 22 and has a segment cut-out 34. In the overlapping region of the spur gear 19 with the carrying member 13, they are connected with one another by welding points 35.

The annular gear 20 surrounding the spur gear 19, similarly to the embodiment of FIGS. 1-3, is provided with the connecting ears 25 which are connected for example by a point welding with the back frame 26 in the upper region of the hinge. The T-shaped movable rail 11 of the seat in FIGS. 4 and 5 has no holding member in the sense of the holding member of the embodiment of FIGS. 1-3. Moreover, the carrying member 13 forms the only supporting part between the hinge and a foot region 36 of the T-shaped movable rail 11, on the one hand, and the angle 31 with the receiving points 33 for the seat cushion on the other hand. For guaranteeing the axial assembly of the hinge in its lower region, a holding segment 37 is connected with the carrying member 13, for example by point welding. The holding segment 37 has a bend guide wall which laterally overlaps the annular gear 20. For forming the T-shaped foot region 36 of the movable rail 11, a substantially U-shaped finishing member 39 is connected with the carrying member 13. It completes the foot portion on the carrying member 13 in a mirror-symmetrical manner and together with the same engages in the guide rail 10 to be supported on the rollers 12. The remaining structural elements of the embodiment of FIGS. 4 and 5 substantially correspond to the respective elements of FIGS. 1-3.

A further modification of the embodiment of FIGS. 4 and 5 is shown in FIGS. 6 and 7. Though in the last-shown embodiment the movable rail 11 can be formed substantially only of the carrying member 13 as in the embodiment of FIGS. 4 and 5, in the construction shown in FIGS. 6 and 7 the T-shaped movable rail 11 is again formed of the carrying member 11 and holding member 14. In contrast to the embodiment of FIGS. 4 and 5, the carrying member 13 is provided, however, with a connecting ear 40 which overlaps the entire spur gear 19 and can be fixedly connected with the same for example by point welding. The spur gear 19 is also overlapped in this embodiment by the annular gear 20 which is punched supported with its punched supporting disk 21 on the centric portion 23 of the pivot axle 22. For axially securing of the spur gear 19 or the annular gear 20, a bend 17 is formed on the holding member 14 in the connecting region of the hinge. The bend 17 surrounds the annular gear 20 in the lower region of the hinge. The remaining parts of the embodiment of FIGS. 6 and 7 substantially correspond to the parts of the preceding embodiments.

In all the embodiments described above, the movable rail 11 serves as a support for the seat cushion and is completely integrated in the seat part. This is also true for the hinge which in turn in all embodiments is a component of the movable rail 11. For turning the back frame 26 and therefore the back 15 to one or another direction, it suffices to rotate the handle 30. The spur gear 19 is held in non-rotatable manner on the movable rail 11 and is rotated with the pivot axle 22 supporting the eccentric portion 24, whereby the centric portion 23 and the coaxial bearing pin 28 rotate about a longitudinal central axis of the eccentric portion 24 with the respective eccentricity. During rotation of the pivot axle, the tooth engagement point between the spur gear 19 and the annular gear 20 correspondingly rotate, so that because of the teeth number difference between the spur gear 19 and the annular gear 20 during one revolution of the pivot axle 22 the annular gear 20 rotates by the pitch corresponding to the teeth number difference. Since the back frame 26 is connected via the connecting ears 25 with the annular gear 20 forming one hinge part, the annular position of the back part is respectively adjusted.

It will be understood that each of the elements described above, or two or more together, may also find a useful application in other types of constructions differing from the types described above.

While the invention has been illustrated and described as embodied in a seat, particularly for a power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A seat, particularly a power vehicle seat, comprising a seat part; a back part; two seat rail elements arranged at both longitudinal sides and connectable with a vehicle bottom, each of said seat rail elements including an elongated guide rail and a movable rail displaceable along said guide rail, said movable rail including a carrying member and a holding member connected with one another so that said movable rail is T-shaped; means for fixedly connecting said carrying member with said holding member; a hinge pivotally connecting said back part with said seat part, said hinge having a pivot axle and two axially adjacent hinge parts which are arranged on said pivot axle pivotally relative to one another and include position adjusting and fixing means, one of said hinge parts being fixedly connected with said carrying member of said T-shaped movable rails, whereas the other of said hinge parts is connected with said back part and at least partially surrounded and held by said holding member of said T-shaped movable rail so that said movable T-shaped rail axially assembles and holds together said hinge parts of said hinge.

2. A seat as defined in claim 1, wherein said seat part has a predetermined seat contour, said carrying member of said T-shaped movable rail having an upper part provided with a bend which extends substantially in correspondence with the contour of the seat part and is provided with receiving means for a seat cushion.

3. A seat as defined in claim 1, wherein,
said carrying member has a connecting region in which it is connected with said one hinge part, said holding member having a holding region in which it holds said other hinge part, said carrying member being provided in said connecting region with a first bend, whereas said holding member is provided in its holding region with an outwardly extending second bend.

4. A seat as defined in claim 1, wherein said carrying member has a connecting region in which it is connected with said one hinge part and is provided in said connecting region with a segment-like cut-out, said hinge members including a spur gear which is directly connected with said carrying member.

5. A seat as defined in claim 1, wherein said carrying member has a connecting region in which it is connected with said one hinge part and is provided in said connecting region with a connecting ear, one of said hinge parts being formed as a spur gear, said connecting ear of said carrying member overlapping said spur gear at its all sides and being fixedly connected with the same.

6. A seat as defined in claim 1, wherein said hinge has a connecting region in which it is connected with said one hinge part, said holding member including a part engaging in said guiding rail and a holding segment axially supporting said hinge in said connecting region and fixedly connected with said carrying member.

* * * * *